Aug. 5, 1924.
R. M. LOVEJOY
1,503,838
BRAKE ACTUATING MECHANISM
Original Filed Aug. 4, 1919    2 Sheets-Sheet 1
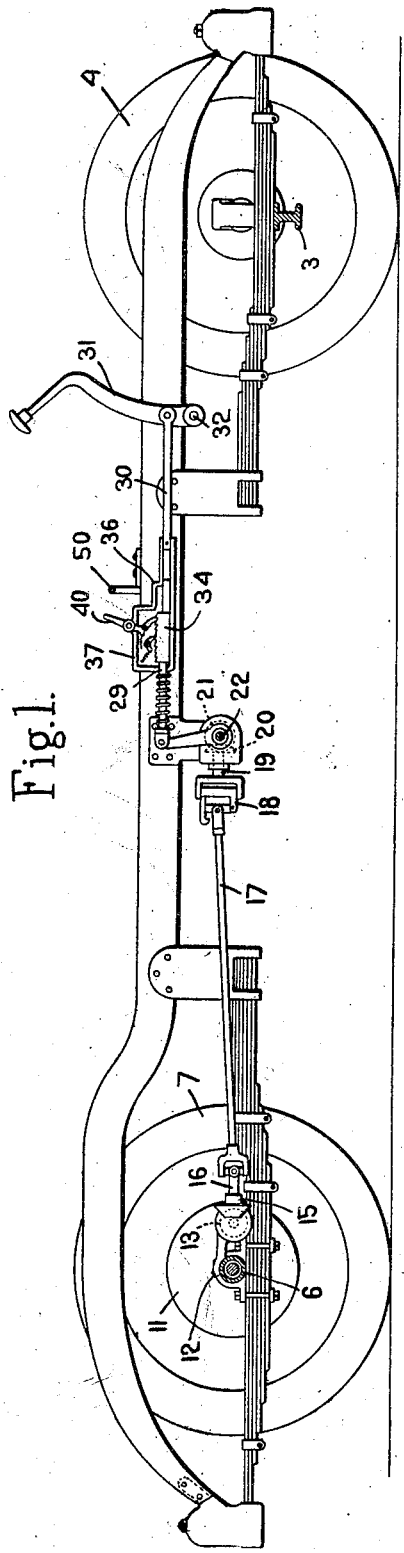
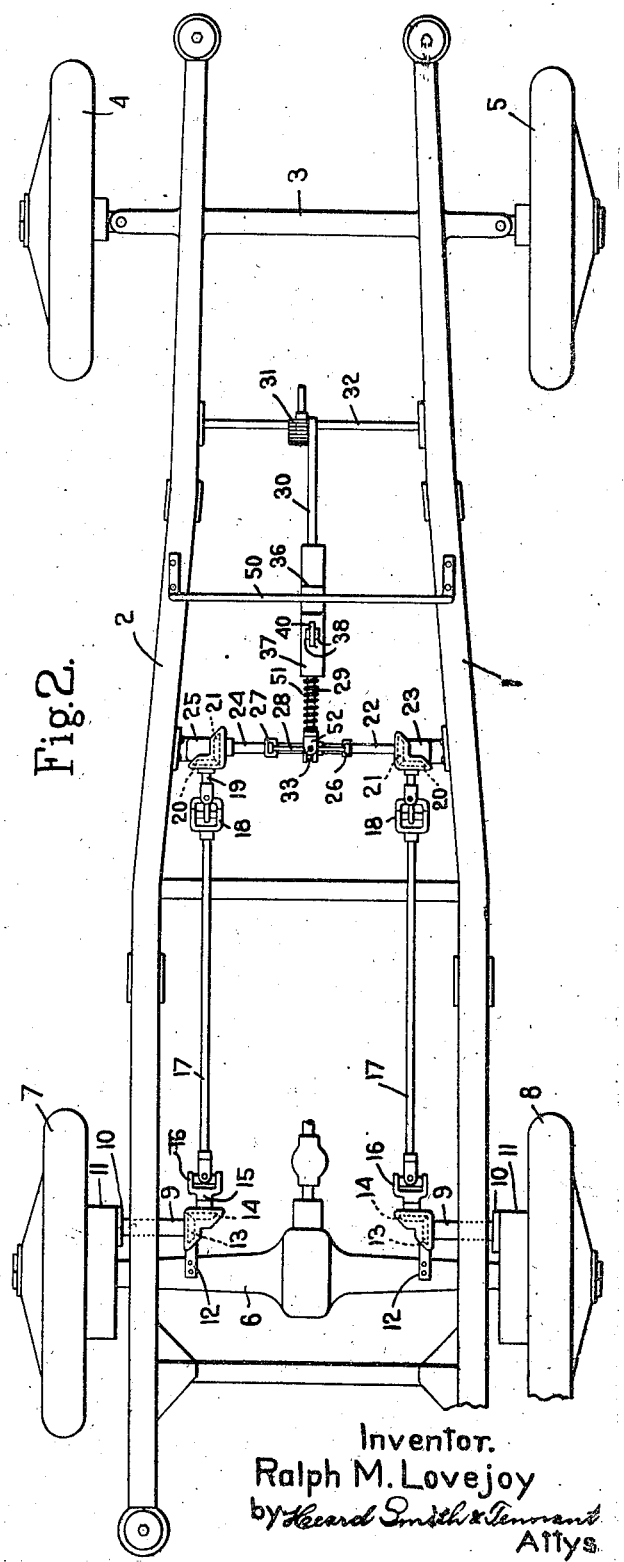
Inventor.
Ralph M. Lovejoy
by Heard Smith & Tennant
Attys.

Aug. 5, 1924. 1,503,838
R. M. LOVEJOY
BRAKE ACTUATING MECHANISM
Original Filed Aug. 4, 1919   2 Sheets-Sheet 2

Inventor.
Ralph M. Lovejoy
by Heard Smith & Tennant.
Attys.

Patented Aug. 5, 1924.

1,503,858

UNITED STATES PATENT OFFICE.

RALPH M. LOVEJOY, OF MEREDITH, NEW HAMPSHIRE.

BRAKE-ACTUATING MECHANISM.

Original application filed August 4, 1919, Serial No. 315,051. Divided and this application filed February 7, 1921. Serial No. 443,000.

*To all whom it may concern:*

Be it known that I, RALPH M. LOVEJOY, a citizen of the United States, and resident of Meredith, county of Belknap, State of New Hampshire, have invented an Improvement in Brake-Actuating Mechanisms, of which the following description, in connection with the accompanying drawing, is a specification, like characters on the drawing representing like parts.

This invention relates to improvements in brake mechanisms for vehicles.

The present application is a division and a continuation of my prior application No. 315,051, filed August 4, 1919.

The usual forms of brake actuating mechanisms heretofore employed have comprised levers connected to the brake and operated by a brake lever within convenient reach of the operator's hand or foot, the power being transmitted from the brake lever to the brake through a system of levers and links. When a machine is running upon a road, and particularly upon a rough road, there is a considerable amount of vertical vibration and certain longitudinal movements between the brake lever and the brakes which are likely to cause a rattling in the connection between the brake lever and the brakes. Furthermore, the wearing of the brake shoes and other members of the braking system causes considerable lost motion between the brakes and brake lever which renders the brake more or less ineffective.

The present invention contemplates the use of a rotatable power transmitting means adapted to be actuated by the brake lever which in turn actuates the brakes whereby the binding of the brake, due to the strain upon the car, will be eliminated.

Another object of the invention is to provide a rotatable equalizing means operable by a brake lever with rotatable means for transmitting the motion of the equalizing means to the respective rotatable brake applying means.

A further object of the invention is to provide means for transmitting the rotary motion from the equalizing means to the rotatable brake applying means with universal, preferably extensible, couplings which will enable both longitudinal and lateral movement between the equalizer and the brake applying means without straining or otherwise affecting the brake applying mechanism.

A further object of the invention is to provide means for automatically taking up any lost motion which may occur between the brake lever and the brakes so that the braking mechanism will always remain in effective condition.

A further object of the invention is to provide a supplemental means operable by a brake lever which, when the brake lever reaches a predetermined position, is operable to actuate the braking mechanism with increased leverage.

Other objects and features of the invention will more fully appear from the following description and the annexed drawings and will be pointed out in the accompanying claims.

A preferred embodiment of the invention is illustrated in the accompanying drawings, in which, Fig. 1 is a side view of the chassis of a vehicle, such as an automobile, showing my invention applied thereto;

Fig. 2 is a plan view of the same;

Figure 3:
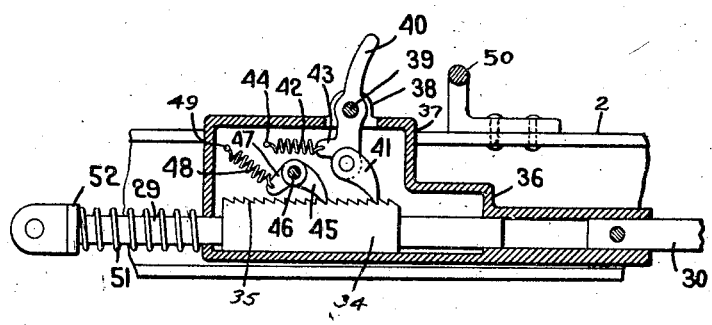
Fig. 3 is a view, partly in vertical longitudinal section, of the sectional connecting instrumentality which unites the brake lever with the equalizer.

The present invention is illustrated herein as applied to an automobile chassis which comprises the usual side frames 1 and 2, a front axle 3 provided with wheels 4 and 5 and a rear axle 6 containing a differential and a suitable shaft for driving the rear wheels 7 and 8.

The wheels 7 and 8 may be provided with any usual type of brake which may be adapted to be operated by the construction forming the subject matter of this invention.

The brake actuating mechanism comprises brake actuating shafts journalled in suitable bearings in tubular housings 9 which may have enlarged bases 10 suitably secured to the housings 11 which contain the brakes. Brackets 12 may also be provided to connect the bearings more securely to the rear axle or to the frame if so desired. Each of the brake actuating shafts is provided at its end with a gear 13, preferably a mitre gear, which engages a complementary mitre gear 14 upon a shaft 15 which is connected by a universal joint 16 with a transmitting rod 17 which desirably is connected at its other end through a universal coupling 18 to the shaft 19 of a mitre gear 20 which meshes with a mitre gear 21 upon one of the members of a rotatable equalizer.

The equalizer may be of substantially the construction disclosed in my prior Patent No. 1,363,607, granted December 28, 1920, and may comprise a shaft 22 journalled in a suitable bearing 23 secured to the frame 2, the shaft 22 telescoping into a tubular shaft 24 which is suitably journalled in a bearing 25 secured to the side frame 1. Suitable co-operating frictional instrumentalities, such as those disclosed in my prior patent aforesaid, desirably are connected to the shafts 22 and 24. Arms 26 and 27 extending upwardly from the shafts 22 and 24 respectively are connected to a common rod 28 which in turn is connected to an adjustable instrumentality, preferably made in two sections 29 and 30 leading to the brake lever 31 which may be pivoted upon a shaft 32 supported at its ends on the side frames 1 and 2. By reason of this construction a powerful leverage multiplying mechanism is provided since the arms 26 and 27 act through the shafts 22 and 24 to rotate small gears 21 the radius of which is very short relatively to the length of the arms 26 and 27 which in turn actuate the gears of the transmitting rod 17.

By providing a frictional instrumentality 33 connected to the shafts 22 and 24, like that disclosed in my prior patent aforesaid, the amount of power transmitted to the brakes operating upon the respective rear wheels may be made substantially equal. Inasmuch as this specific mechanism, however, is immaterial to the present invention detailed description of it is deemed unnecessary.

In usual brake constructions for vehicles, such as automobiles, the brake lever is connected directly to a lever upon an equalizer which in turn has arms connected by links to levers for actuating the brakes. Continuous use of such brake mechanisms has always resulted in the wearing of the brakes, or the connecting mechanisms, in such a manner that it is necessary to press the brake further and further as the wear takes place to obtain effective action.

In the present invention means are provided for automatically taking up the lost motion thus acquired in the braking mechanism. A preferred means for accomplishing this purpose consists of a sectional connection between the brake lever and the equalizer, the said sections being connected by such a suitable means, such as pawl and ratchet mechanism which may be automatically operated to shorten the connection as required, but it is to be understood that my invention contemplates broadly any means for thus automatically taking up such lost motion.

In the preferred embodiment of the invention disclosed herein the section 29 of the instrumentality which connects the brake lever to the equalizing lever is provided with an enlarged portion 34 having a ratchet face 35. This enlarged portion is enclosed within a housing 36 which is secured to or forms a part of a section 30 which is connected to the brake lever 31. The housing 36 desirably has an enlarged upper portion 37 provided with upwardly extending bosses 38 in which the fulcrum shaft 39 of a supplemental lever 40 is mounted. The lower end of the lever 40 carries a pivotally mounted pawl 41 which engages the teeth 35 of the ratchet 34. The pawl 41 may be retained in engagement with the teeth of the ratchet by gravity or in any other suitable manner.

A helical spring 42, connected at one end to a boss 43 and at the other end to a stud 44 extending across the housing 36, serves normally to retain the lower end of the lever 40, which carries the pawl, in retracted position and to advance the upper end of the lever 40 for a purpose which will hereinafter be more fully disclosed.

A locking dog 45 is also provided which is conveniently mounted upon a shaft 46 extending across the housing 36. The dog 45 desirably is provided with a tail 47 which is connected to one end of a spring 48, the other end of which is anchored to a suitable stud 49 upon the housing 37. The spring 48 tends to retain the dog 45 in engagement with the teeth 35 of the ratchet.

A stop, which desirably is in the form of a bar 50, extends across the frame in the path of the lever 40 and effectively engages the lever 40 when the brake mechanism is so adjusted or worn sufficiently to permit the advanced end of the lever 40 to engage the rod 50 as the brake is being applied. It will be obvious that when thus engaged and the brake lever advanced still further the lever 40 will be rocked about its fulcrum, thus advancing the pawl and with it the ratchet 35. The lever 40 thus becomes a supplemental braking lever which increases the effective action of the braking mechanism. When the ratchet has been thus advanced the distance of one tooth the locking dog 45 will engage the next succeeding tooth in the ratchet and retain the amount thus taken up. Upon release of the brake, the connection to the equalizer will be retracted and the upper end of the lever 40 removed from its engagement with the rod 50. The spring 42 will then withdraw the lower end of the lever 40 causing the pawl 41 to engage a different tooth upon the ratchet 35, thereby setting the device for the next take-up operation. It will be noted that this action of the supplemental braking lever 40 will cause a greater movement of the brake actuating mechanism than that usually required even if the movement is insufficient to cause the ratchet to be advanced so that a more perfect braking action is possible than in usual constructions. This increased efficiency of the braking mechanism is especially advantageous when the automobile is being operated in heavy traffic where sudden stops are frequently necessary.

A spring 51 interposed between the head 52 of the rod 29 and the end of the housing 36 serves normally to force the casing 37 forward and to retain the ratchet in proper engagement with the pawl 41 and dog 45 notwithstanding any sudden releasing of the brake lever.

Figure 4:
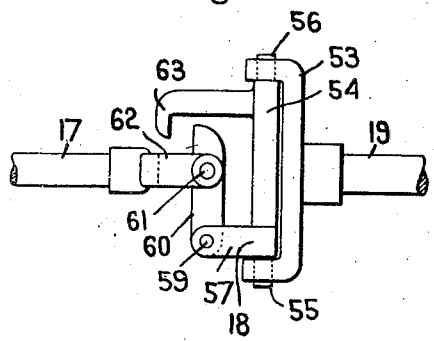
Fig. 4 is a detail elevation of an extensible universal coupling.
Figure 5:
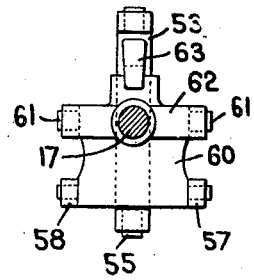
Fig. 5 is an end view of the coupling shown in Fig. 4 viewed from the left side of said figure.

In the operation of braking mechanisms there is considerable twisting of the connection between the equalizer and the brakes by reason of the uneven degree of elevation of the sides of the frames when running over a rough or uneven road. In order to avoid this difficulty and to produce a more efficient braking mechanism I have provided a system of gearing, such as that above described, for transmitting motion from the equalizer to the brake actuating shafts and have interposed in said transmitting mechanism one or preferably a plurality of extensible joints 16 and 18. The preferred form of extensible joint is illustrated in Figs. 4 and 5 and the description of one of said joints will serve as a description for all.

The shaft 19 is provided at one end with a yoke 53 in which a gate 54 is mounted, the pivotal ends 55 and 56 of said gate preferably extending through journals in the yoke, so positioned that the pivotal axis of the gate is at right angles to and intersects the axis of the shaft 19. The gate 54 is provided with extensions 57 and 58 which serve as journals for a pivotal shaft 59 of an arm or web 60, the upper portion of which is provided with pivotal connections 61 to a yoke 62 upon the end of the shaft 17.

Actuation of the brake lever 31 causes the oscillation, through the equalizer, of the arms 26 and 27 of the shafts 22 and 24, thus rotating the gears 21 and 20, thereby rotating the shaft 19 which, acting through the universal joints 18 above described, operates the transmitting rod 17 to apply the brakes. If there is any longitudinal movement between the shaft 19 and the transmitting rod 17 it will be compensated for by the movement of the arm 60 of the universal coupling about its pivot 59 without in any wise affecting the proper operation of the shaft.

It will be noted that except for the extensibility of the coupling members the coupling operates as the usual type of universal joint in which the sections of a shaft are pivoted respectively to a common member so that the axes of the pivotal connections stand at right angles to each other.

In order to prevent too great longitudinal movement between the shaft 19 and the transmitting rod 17 the gate 54 desirably is provided with a hook-like extension 63 which overlies the end of the arm or web 60 and limits its movement beyond a predetermined distance.

By reason of this extensible universal coupling any amount of movement, either longitudinal or lateral, between the equalizer and the brake shaft will be compensated for and the effective operation of the brake at all times insured.

It will be understood that the embodiment of the invention disclosed herein is illustrative and not restrictive and that various modifications in structure and arrangement of parts may be made within the spirit and scope of the following claims.

Having thus described my invention, what I claim as new, and desire to secure by Letters Patent, is:

1. Brake mechanism comprising a brake, means for actuating the same including a brake lever, and means connecting said brake lever to said brake automatically operable to take up lost motion during the brake-applying movement of the brake lever.

2. Brake mechanism comprising a brake, means for actuating the same including a brake lever, means connecting said brake lever to said brake automatically operable by further brake-applying movement of the brake lever to take up lost motion and simultaneously to increase the force of application of the brake.

3. Brake mechanism comprising a brake, a brake lever, a supplemental lever intermediate of said brake and brake lever automatically operable when said brake lever is advanced beyond a predetermined position to apply said brake.

4. Brake mechanism comprising a brake, a brake lever, a sectional instrumentality connecting said brake lever to said brake, a supplemental lever and means for automatically actuating said supplemental lever when said brake lever is advanced in its brake-applying movement beyond a predetermined position to increase the action of said brake.

5. Brake mechanism comprising a brake, means for actuating the same including a brake lever, a sectional instrumentality connecting said brake lever to said brake, means for automatically shortening the effective length of said sectional instrumentality when the brake lever is advanced in its brake-applying movement beyond a predetermined point.

6. Brake mechanism comprising a brake, a brake lever, a sectional instrumentality including a pawl and ratchet carried by the respective sections of said instrumentality, means operable to actuate said pawl when the brake lever is advanced in its brake-applying movement to a predetermined point and upon further movement of said brake lever to cause said pawl to advance said ratchet, and means for locking the ratchet in advanced position whereby the sectional instrumentality will be automatically shortened.

7. Braking mechanism comprising a plurality of brakes, rotatable brake actuating shafts, a rotatable equalizing means, rotatable means connecting said equalizing means to said brake actuating shafts, a brake lever, a sectional instrumentality connecting said brake lever to said equalizing means, pawl and ratchet mechanism carried by the respective sections of said instrumentality, means for actuating said pawl when the brake lever is advanced in its brake-applying movement to a predetermined position whereby the effective length of said sectional instrumentality will be shortened and means for locking said instrumentality in the shortened position.

8. Brake mechanism comprising a brake, a brake lever, means connecting said brake lever to said brake including a sectional instrumentality comprising a housing connected to one of the members of said sectional instrumentality and a rack telescopically mounted in said housing connected to the other member of said sectional instrumentality, a lever fulcrumed upon said casing having a pawl on one arm thereof engaging said rack and the other arm thereof movable into engagement with a stationary member during the brake-applying movement of said brake lever and operable upon further movement of said brake lever to shorten the effective length of said sectional instrumentality and a dog mounted upon said casing engaging said rack acting to retain the sectional instrumentalities in said shortened condition.

In testimony whereof, I have signed my name to this specification.

RALPH M. LOVEJOY.